United States Patent
Jeong et al.

(10) Patent No.: US 8,566,355 B2
(45) Date of Patent: Oct. 22, 2013

(54) ACCOUNT MANAGEMENT APPARATUS AND METHOD OF MANAGING ACCOUNT

(75) Inventors: Yong-sik Jeong, Suwon-si (KR); Yong-chan Kwon, Anyang-si (KR); Jung-ha Kim, Suwon-si (KR)

(73) Assignee: Samsung Electronics Co., Ltd, Suwon (KR)

( * ) Notice: Subject to any disclaimer, the term of this patent is extended or adjusted under 35 U.S.C. 154(b) by 105 days.

(21) Appl. No.: 12/926,365

(22) Filed: Nov. 12, 2010

(65) Prior Publication Data

US 2011/0218892 A1    Sep. 8, 2011

(30) Foreign Application Priority Data

Mar. 4, 2010 (KR) .................. 10-2010-0019462

(51) Int. Cl.
*G06F 7/00* (2006.01)
(52) U.S. Cl.
USPC .......................................... 707/787
(58) Field of Classification Search
None
See application file for complete search history.

(56) References Cited

U.S. PATENT DOCUMENTS

2002/0175208 A1* 11/2002 Bartley et al. ................. 235/380
2007/0255837 A1* 11/2007 Hassan et al. ................. 709/227

FOREIGN PATENT DOCUMENTS

JP          2006-235757       *  9/2006

\* cited by examiner

*Primary Examiner* — Matthew Gart
*Assistant Examiner* — Michael Maicher
(74) *Attorney, Agent, or Firm* — Staas & Halsey LLP

(57) ABSTRACT

An apparatus to manage an account is provided. The account managing apparatus includes an account management unit which manages a user account of at least one user who uses an image forming apparatus, a storage unit which stores guest information related to the user account, a guest account generating unit which generates a guest account dependent on the user account based on stored guest information and the user account when a request to generate an account to use the image forming apparatus is received from a guest, and a control unit which controls the image forming apparatus according to a generated account policy.

18 Claims, 16 Drawing Sheets

FIG. 3

| USER LIST | | | | |
|---|---|---|---|---|
| CHOSEN 0 AMONG 2 IN TOTAL | | | SEND USER (CSV) | |
| — ✱ | | [SEARCH] | DISPLAY: ALL ▼ | |
| ☐ USER NAME | USER LOG-IN | USER TYPE | E-MAIL | APPARATUS P |
| ☐ ek46.yun | corp\ek46.yun | LDAP | ek46.yun@samsung.com | APPARA |
| ☐ ys80.jeong | corp\ys80.jeong | LDAP | ys80.jeong@samsung.com | APPARA |

▼ PAGE [1] /1 ▶

ADD USER

BRING USER (CSV)  APPLY  CANCEL

⦿ LOCAL USER
USER NAME :
USER LOG-IN :
PASSWORD :
E-MAIL :

○ LDAP (DOMAIN) USER
SERVER URL :
USER NAME :
USER LOG-IN :
PASSWORD :
SEARCH FILTER :

SEARCH

☐ USER NAME | USER LOG-IN | E-MAIL

FIG. 4

| BRING USER (CSV) | APPLY | CANCEL |

⊙ LOCAL USER ─── 420
USER NAME : YongSik Jeong ─── 421
USER LOG-IN : ys80.jeong ─── 423
PASSWORD : •••• ─── 425
E-MAIL : ys80.jeong@samsung.com ─── 427

FIG. 5

| USER LIST | | | | | |
|---|---|---|---|---|---|
| CHOSEN 1 AMONG 4 IN TOTAL | | | | SEND USER (CSV) | |
| ☐ ☼ | | | | [SEARCH] DISPLAY: ALL ▶ | |
| ☐USER NAME | USER LOG-IN | USER TYPE | E-MAIL | | APPARATUS P |
| ☐Andy choi | andy | LOCAL | andy@sec.co.kr | | APPARA |
| ☐James Kang | James | LOCAL | James@sec.co.kr | | APPARA |
| ☐Joshua Jeong | Joshua | LOCAL | Joshua@sec.co.kr | | APPARA |
| YongSik Jeong | ys80jeong | LOCAL | ys80.jeong@samsung.com | | APPARA |

▼ PAGE [1] /1 ▲

ADD USER
AUTHORITY
| ☑FUNCTION | UNLIMITED | AUTHORITY |
|---|---|---|
| ☑PRINT(COLOR) | NO | 250 |
| ☑PRINT(MONO) | NO | 250 |
| ☑COPY(COLOR) | NO | 250 |
| ☑COPY(MONO) | NO | 250 |
| ☑FAX | NO | 250 |
| ☑SCAN | NO | 250 |

☑Enable Customer Accounts
Max Account Number per Month: 5
Session Life Time: [Every 1 hour ▶]
Every 30 minutes
Every 1 hour
Every 6 hour
Every 12 hour
Every day AUTHORITY
| ☐FUNCTION | UNLIMITED | AUTHORITY |
|---|---|---|
| ☑PRINT(COLOR) | NO | 50 |
| ☑PRINT(MONO) | NO | 50 |
| ☑COPY(COLOR) | NO | 50 |
| ☑COPY(MONO) | NO | 50 |
| ☐FAX | NO | 250 |
| ☐SCAN | NO | 250 |

| Column Name | Data Type | Allow Nulls |
|---|---|---|
| id | char(64) | ☐ |
| maxAccountCounts | int | ☐ |
| lifeTime | int | ☐ |
| isMonoCopyAvailable | nchar(10) | ☐ |
| isColorCopyAvailable | nchar(10) | ☐ |
| isMonoPrintAvailable | nchar(10) | ☐ |
| isColorPrintAvailable | nchar(10) | ☐ |
| isFaxAvailable | nchar(10) | ☐ |
| isScanAvailable | nchar(10) | ☐ |
| monoCopyQuota | int | ☑ |
| ColorCopyQuota | int | ☑ |
| monoPrintQuota | int | ☑ |
| ColorPrintQuota | int | ☑ |
| faxQuota | int | ☑ |
| ScanQuota | int | ☑ |

| Column Name | Data Type |
|---|---|
| id | ys80.jeong |
| maxAccountCounts | 5 |
| lifeTime | 60 |
| isMonoCopyAvailable | Yes |
| isColorCopyAvailable | Yes |
| isMonoPrintAvailable | Yes |
| isColorPrintAvailable | Yes |
| isFaxAvailable | No |
| isScanAvailable | No |
| monoCopyQuota | 50 |
| ColorCopyQuota | 50 |
| monoPrintQuota | 50 |
| ColorPrintQuota | 50 |
| faxQuota | NULL |
| ScanQuota | NULL |

| | Column Name | Data Type | Allow Nulls |
|---|---|---|---|
| | employeeId | char(64) | ☐ |
| | customerName | char(64) | ☐ |
| | customerId | char(13) | ☐ |
| ▶ | ///// | | |

|  | Column Name | Data Type |
|---|---|---|
|  | employeeId | ys80.jeong |
|  | customerName | HONG GIL DONG |
|  | customerId | 76110119876543 |
| ▶ | ///////// |  |

1000

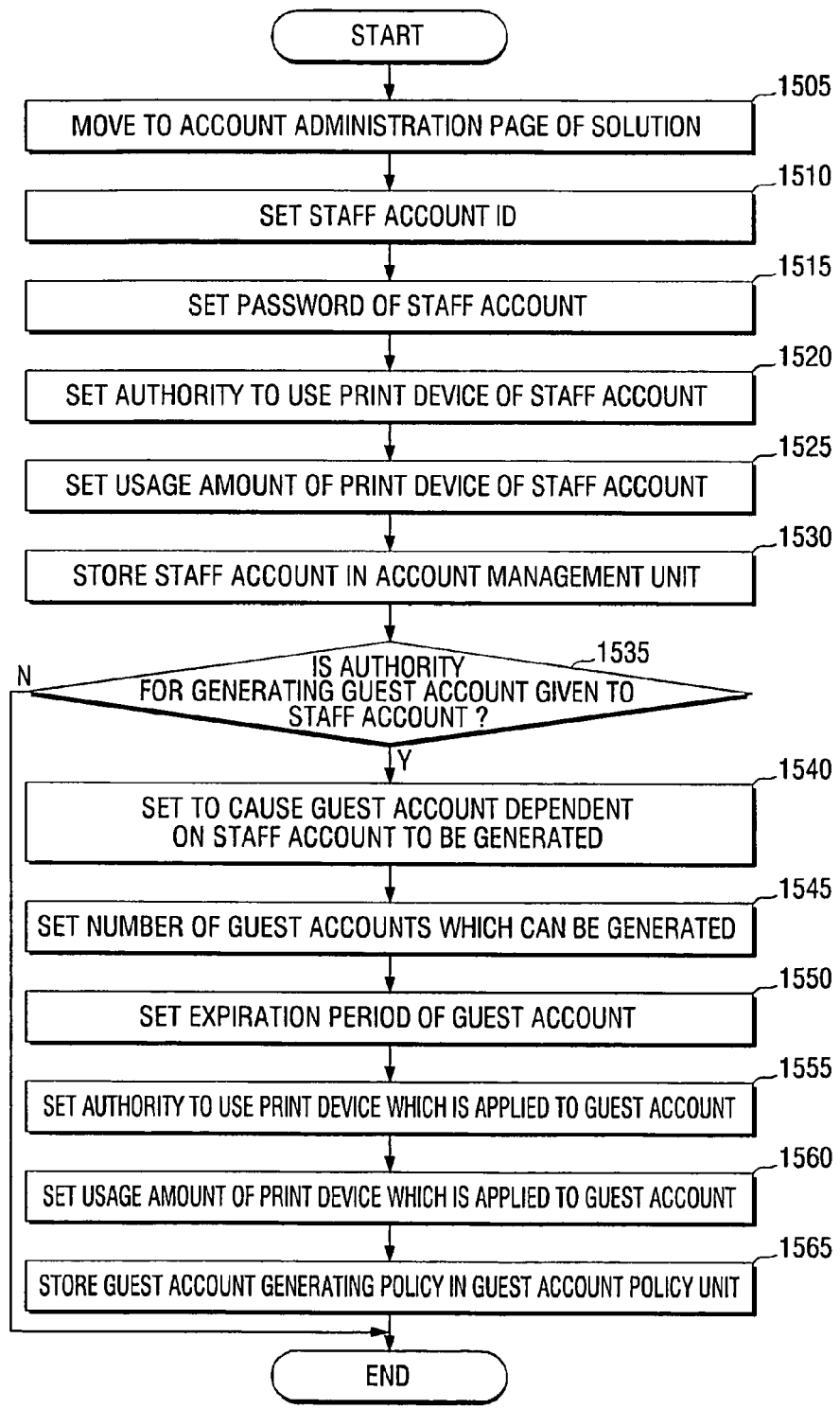

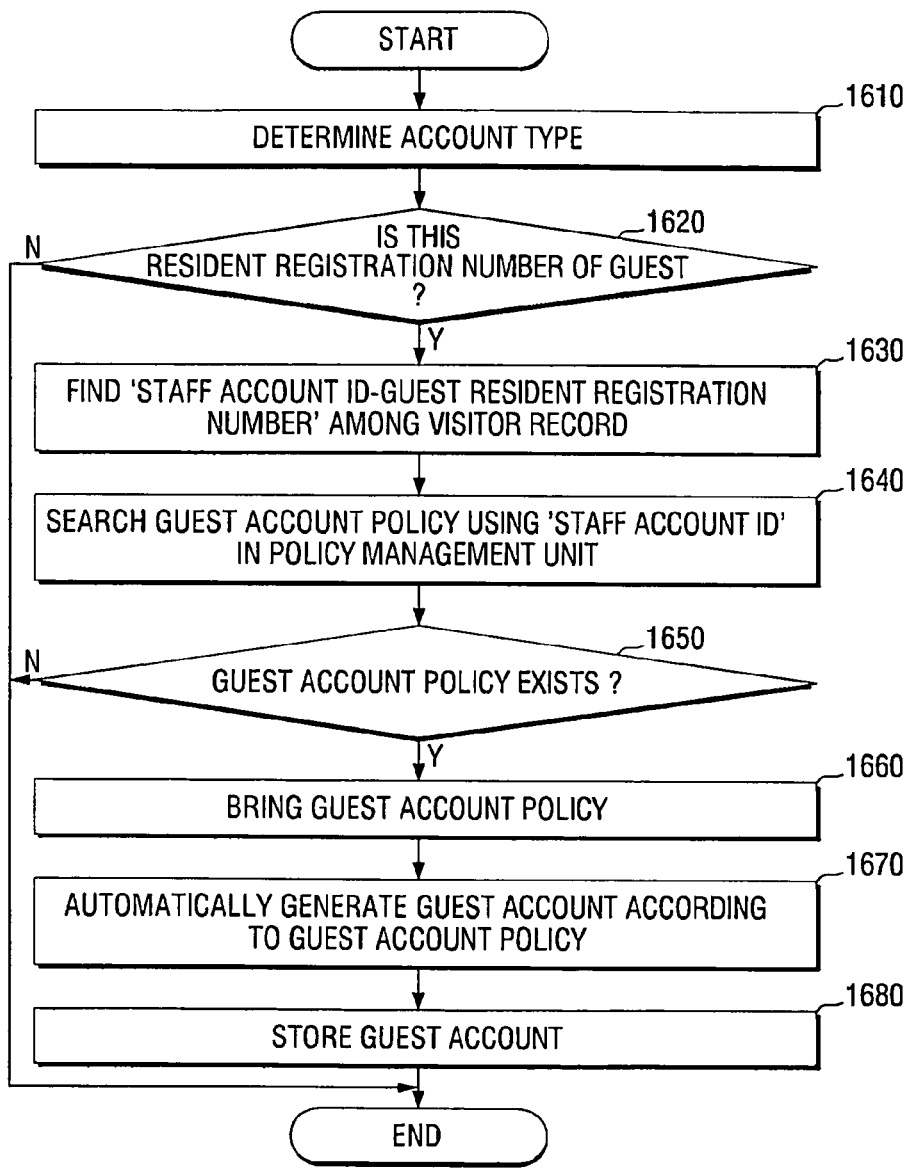

ACCOUNT MANAGEMENT APPARATUS AND METHOD OF MANAGING ACCOUNT

CROSS-REFERENCE TO RELATED APPLICATIONS

This application claims priority from Korean Patent Application No. 2010-19462, filed in the Korean Intellectual Property Office on Mar. 4, 2010, the disclosure of which is incorporated herein by reference.

BACKGROUND

1. Field

Aspects of the at least one embodiment relate to an account management apparatus and a method of managing an account, and more particularly, to an account management apparatus which easily generates a visitor's account to use an image forming apparatus based on information regarding staff and the visitor, and a method of managing an account thereof.

2. Description of the Related Art

Generally, an image forming apparatus is an apparatus that prints print data generated from a terminal, such as a computer, on a recording paper, and examples of such an image forming apparatus include a copy machine, a printer, a facsimile or a Multi-Function Peripheral (MFP) which combines the functions of all apparatuses into one.

Recently, as security has become important in our society, corporations or public organizations have granted accounts to all users of an image forming apparatus to allow the users to use the image forming apparatus with the granted accounts.

Accordingly, a guest (or a visitor) should use an already-created account or request an administrator to grant an account in order to use an image forming apparatus, which cause inconvenience to the guest (or the visitor).

If a guest uses an image forming apparatus with a borrowed account, it is difficult for an administrator to know whether the usage is for management or simply for work by the guest. In addition, account information of the user who loaned the account may be leaked in the process.

When a guest requests the administrator to grant an account, the administrator may not generate the account in real time due to limitations of time and space, and thus it takes time for the guest to obtain the account. Moreover, the administrator needs to delete the guest's account after the guest's visit, which adds difficulty in managing accounts.

SUMMARY

Aspects of the present invention relate to an account management apparatus which easily generates a visitor's account for using an image forming apparatus based on information regarding staff and the visitor and a method for managing an account thereof.

Additional aspects and/or advantages will be set forth in part in the description which follows and, in part, will be apparent from the description, or may be learned by practice of the invention.

The foregoing and/or other aspects are achieved by providing an account management apparatus which is connected to at least one of an image forming apparatus, including an account management unit which manages a user account of at least one user who uses the image forming apparatus, a storage unit which stores guest information related to the user account, a guest account generating unit which generates a guest account dependent on the user account based on the stored guest information and the user account when a request to generate an account to use the at least one image forming apparatus is received from a guest, and a control unit which controls the image forming apparatus according to the generated guest account.

The guest account generating unit may generate a guest account dependent on the user account when the user information is input as identifier (ID) information and the guest information is input as a password.

The user information may be a user ID and the guest information may be at least one of a resident registration number, a mobile phone number and an email address of the guest.

The account management unit may make a request to change a password of the guest account when the generated guest account is accessed for the first time.

The apparatus may further include a policy management unit which manages a guest account policy which is dependent on the user account.

The guest account policy may include whether a guest account is authorized to be generated for each user, and the guest account generating unit may generate a guest account after determining that a guest account is authorized to be generated for the guest according to the guest account policy.

The guest account policy may include an expiration period, and the account management unit may limit use of the generated guest account when the expiration period ends.

The guest account policy may include information regarding authority for use of the at least one image forming apparatus for each guest, and the account management unit may control use of the at least one image forming apparatus for the guest according to the guest account policy.

The apparatus may further include a communication interface unit which receives a print history of the guest from the image forming apparatus, and the storage unit may store the received print history.

The foregoing and/or other aspects are achieved by providing a method of managing an account of an account management apparatus which is connected to at least one image forming apparatus, including storing a user account of at least one user authorized to use the at least one image forming apparatus and guest information related to the user account, receiving a request to generate an account to use the at least one image forming apparatus from the guest, generating a guest account which is dependent on the user account based on the stored guest information and the user account, and controlling the at least one image forming apparatus according to the generated guest account.

The guest account dependent on the user account may be generated when the user information is input as ID information and the guest information is input as a password.

The user information may be a user ID and the guest information may be at least one of a resident registration number, a mobile phone number and an email address of the guest.

The method may further include requesting to change a password of the guest account when the generated guest account is accessed for a first time.

The method may further include setting a guest account policy dependent on the user account.

The guest account policy may include whether a guest account is authorized to be generated for each user, and the guest account may be generated according to the guest account policy after determining that a guest account is authorized to be generated for the guest.

The guest account policy may include an expiration period, and the method may further include limiting use of the generated guest account when the expiration period ends.

The guest account policy may include a usage amount of the at least one image forming apparatus allocated to each guest account, and use of the at least one image forming apparatus by the guest may be controlled according to the guest account policy.

The method may further include receiving a print history of the guest from the at least one image forming apparatus and storing the received print history.

The foregoing and/or other aspects are achieved by providing a method of managing an account of an account management apparatus connected to at least one image forming apparatus, the method including: associating a guest account of a guest to use the at least one image forming apparatus with a user account of at least one user of the at least one image forming apparatus; determining whether input information is information regarding only the user account or is information regarding the user account and the guest account; accessing the guest account when it is determined that the input information is information regarding the user account and the guest account; and controlling the at least one image forming apparatus according to the guest account when the guest account is accessed.

The guest account may be associated with the user account according to a guest-account generating authority set dependent on the user account.

The information regarding only the user account may be at least a user identifier, and the information regarding the guest account is a password of the guest.

The foregoing and/or other aspects are achieved by providing a method of managing an account of an account management apparatus connected to at least one image forming apparatus, the method including: authorizing a user account of at least one authorized user of the at least one image forming apparatus to generate a guest account of a guest to use the at least one image forming apparatus, the guest account being associated with the user account; generating the guest account associated with the user account when information regarding the user account and information regarding the guest is received at the account management apparatus; and controlling the at least one image forming apparatus according to the guest account.

BRIEF DESCRIPTION OF THE DRAWINGS

The above and/or other aspects will be more apparent by describing certain present disclosure with reference to the accompanying drawings, in which:

FIGS. 3 to 6 are views illustrating various examples of a user interface window which may be displayed on the account management apparatus of FIG. 1;

FIGS. 7 to 8 are views illustrating an example of a guest account policy according to at least one embodiment;

FIGS. 9 to 10 are views illustrating examples of user information according to at least one embodiment;

FIG. 15 is a flowchart to explain a method of setting a guest account policy according to at least one embodiment; and FIG. 16 is a flowchart to explain operation to generate the guest account in FIG. 14 in detail.

DETAILED DESCRIPTION

Figure 1:
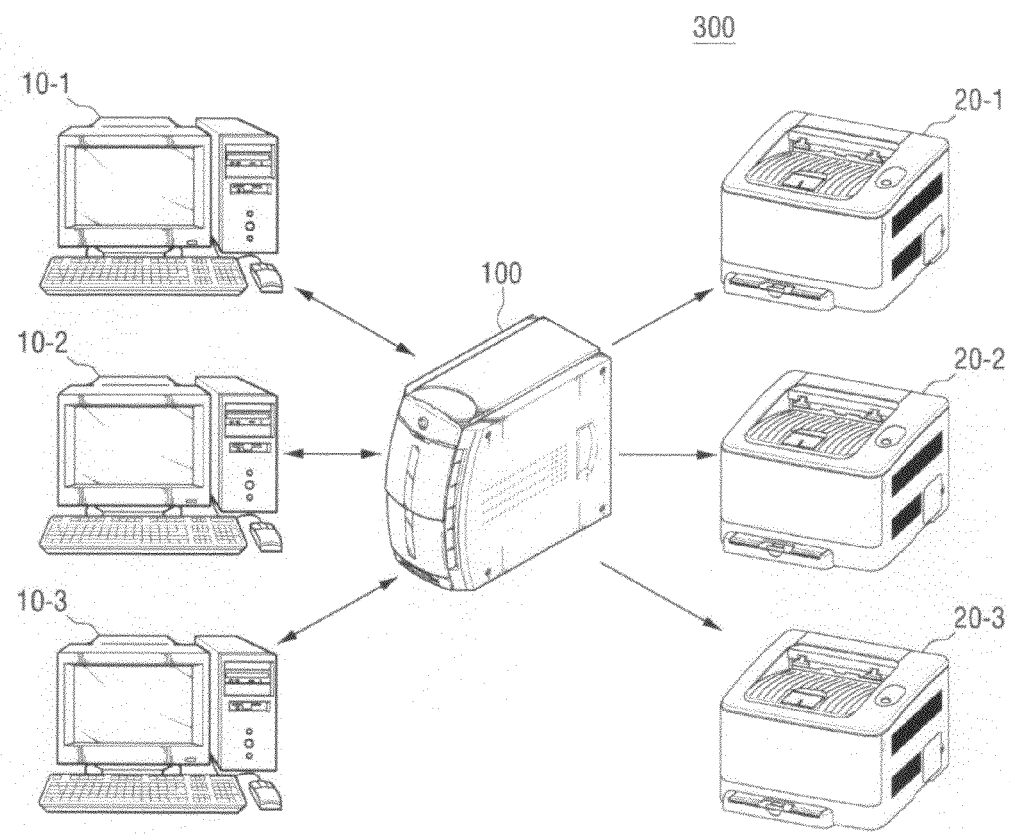
FIG. 1 is a schematic of an image forming system according to at least one embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram of an image forming system according to at least one embodiment.

Referring to FIG. 1, an image forming system 300 includes an account management apparatus 100, a print control terminal 10, and an image forming apparatus 20.

The account management apparatus 100 stores user account information and guest information, and upon receiving a request to generate an account to use the image forming apparatus 20 from a guest, generates a guest account dependent on the user account based on the stored guest information and the user account, and controls the image forming apparatus 20 according to the newly-generated guest account. Detailed configuration and operation of the account management apparatus 100 will be explained below with reference to FIG. 2. The account management apparatus 100 may be in the form of a terminal, such as a PC, as well as a server.

If the print control terminal 10 receives a print command from a user or a guest, the print control terminal 10 may generate a print job and transmit the print job to the image forming apparatus 20. The print control terminal 10 may request the account management apparatus 100 to generate a new account. Specifically, the print control terminal 10 may display a user interface (UI) window to receive an input of user account information and guest information, and may receive an input of the user account information and the guest information. The received user account information and the guest information may be transmitted to the account management apparatus 100, thus requesting generating a guest account.

The image forming apparatus 20 may be connected to the print control terminal 10 and perform a print job according to a request from the print control terminal 10. Specifically, if the image forming apparatus 20 receives a request to perform a print job from the print control terminal 10, the print job may be performed according to the account information of the requested user or guest, in other words, according to the control of the account management apparatus 100.

The image forming apparatus 20 may transmit print history of a user or a guest to the account management apparatus 100.

In FIG. 1, three image forming apparatuses 20-1, 20-2, 20-3 are directly connected to the account management apparatus 100, but this is only an example. More or less than three image forming apparatuses may be connected to the account management apparatus 100, and be connected directly or indirectly through a router. In FIG. 1, the three image forming apparatuses 20-1, 20-2, 20-3 have the same configuration, but each of them may be a different apparatus, such as a copy machine, a printer (a laser printer, a inkjet printer, etc.), a facsimile, and a Multi-Functional Peripheral(MFP) which combines the functions of all the apparatuses into one.

Figure 2:
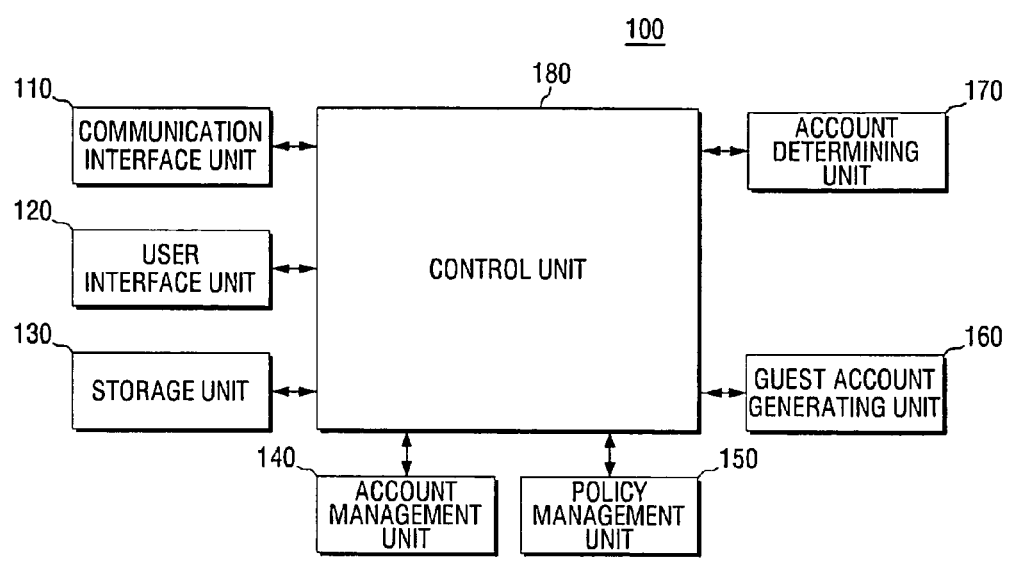
FIG. 2 is a block diagram illustrating detailed configuration of the account management apparatus in FIG. 1.

FIG. 2 is a block diagram illustrating the configuration of the account management apparatus according to at least one embodiment.

Referring to FIG. 2, the account management apparatus 100 includes a communication interface unit 110, a user interface unit 120, a storage unit 130, an account management unit 140, a policy management unit 150, a guest account generating unit 160, an account determining unit 170, and a control unit 180.

The communication interface unit 110 is designed to connect the account management apparatus 100 to image forming apparatuses 20-1, 20-2, 20-3, . . . and print control terminals 10-1, 10-2, 10-3, . . . , and may be connected not only by wired or wireless communication through a Local Area Network (LAN) and an Internet network, but also through a Universal Serial Bus (USB) port, for example.

The communication interface unit 110 may receive various information regarding generating a guest account from the print control terminal 10. Specifically, the communication interface unit 110 may receive user account information, such as a user (staff) ID and guest information, such as a guest registration number from the print control terminal 10.

The communication interface unit 110 may transmit various information regarding generating a guest account to the print control terminal 10. Specifically, the communication interface unit 110 may transmit a UI window to receive user account information and guest information from a guest to the print control terminal 10. Once the account is generated based on the received account information and guest information, the communication interface unit 110 may transmit information regarding authority and amount of usage set in the guest account to the print control terminal 10.

The communication interface unit 110 may receive a user authentication request from the image forming apparatus 20 and transmit the result of user authentication to the image forming apparatus 20. In addition, the communication interface unit 110 may transmit information on the authority and amount of usage set in the user account to the image forming apparatus 20. The communication interface unit 110 may receive the print history of the user from the image forming apparatus 20. The received print history may be stored in the storage unit 130.

The user interface unit 120 includes various function keys with which a user may set or select various functions supported by the account management apparatus 100, and may display various information provided by the account management apparatus 100. The user interface unit 120 may be realized as an apparatus, such as a touch pad in which input and output are performed at the same time, or may be realized by combining an input apparatus, such as a mouse and a keyboard, with a display apparatus, such as a CRT monitor, a LCD monitor, and a LED.

The user interface unit 120 may display a UI window to receive a setting of a guest account policy. An administrator may set a guest account policy through the displayed UI window. The guest account policy refers to a policy in which the administrator sets conditions to generate an account and authority information on the generated guest in advance. The guest account policy may include information such as whether a guest account dependent on a user account may be generated, the number of guest accounts which may be newly generated, and authority and amount of usage for each guest account.

The user interface unit 120 may receive information needed to generate a new account. Specifically, a user account and guest information may be input through the print control terminal 10 or through the account management apparatus 100 to generate a guest account directly.

The user interface unit 120 may display print history. Specifically, the user interface unit 120 may display print history by each image forming apparatus 10 managed by the account management apparatus 100. The user interface unit 120 may also display information on the print history by each user and each guest. A UI window to receive the setting of a guest account policy and a UI window to display print history will be explained below with reference to FIGS. 3 and 6.

The storage unit 130 stores user account information. The storage unit 130 stores a guest account policy of each user account. Specifically, the storage unit 130 may store a guest account policy on a user set through the user interface unit 120 in the form of a table as illustrated in FIGS. 7 and 8.

The storage unit 130 stores guest information. Specifically, the storage unit 130 may store guest information corresponding to a user as illustrated in FIGS. 9 and 10. The guest information may include information such as a name, a registration number, a mobile phone number (or phone number), and an e-mail address, which makes it possible to identify each guest. If such information is input directly by the guest and authenticated by staff related to the guest, the information may be stored as guest information. In addition, the guest information may be input directly by a user (or staff) and stored in the storage unit 130, or be acquired and stored in various ways other than the above-mentioned way.

The storage unit 130 stores print history. Specifically, the storage unit 130 may store the print history of a user and guest received from the image forming apparatus 20 through the communication interface unit 110. The storage unit 130 may be realized as a storage medium within the account management apparatus 100 or an external storage medium, such as a removable disk including a USB memory, a storage medium connected to a host, or a web server through a network.

The account management unit 140 manages a user account and a guest account. Specifically, the account management unit 140 manages a user account of at least one of users who use the image forming apparatus 20, and a guest account generated by the guest account generating unit 160 which will be explained below. For example, the account management unit 140 determines whether or not a user who requested a print job is an authenticated user according to a request from the image forming apparatus 20, and controls the image forming apparatus 20 to perform various functions of the image forming apparatus according to the set account information (i.e., the authority for function and set amount of usage).

The account management unit 140 may manage a generated guest account according to a set guest account policy. Specifically, if an expiration period for the guest account exists in the guest account policy, the account management unit 140 maintains the guest account only for the expiration period, and limits or deletes the guest account once the expiration period is over.

If a newly-generated guest account is accessed for the first time, the account management unit 140 may allow the password of the guest account to be changed. Specifically, the guest management unit 140 may request a guest to change the password when the guest accesses the guest account for the first time for security of the guest account. If the guest changes the password, the information in the storage unit 130 may be changed.

The policy management unit 150 manages a guest policy dependent on a user account. Specifically, if an administrator revises/generates a guest account policy on a user through the user interface unit 120, the guest account policy stored in the storage unit 130 may be revised/generated.

The guest account generating unit 160 receives a request to generate an account to use an image forming apparatus from a guest, and generates a guest account dependent on a user account based on the stored guest information and user account. Specifically, if the guest account generating unit 160 receives a request to generate an account from a guest (in other words, if ID information is input as user information and a password is input as guest information in the process of logging-in), the guest account generating unit 160 determines whether or not the input ID information is ID information of a registered user and whether or not guest information related to the user exists. If the guest information related to the user is consistent with information input through a password by a user, a guest account dependent on the user account may be generated. The generated guest account may have authority set in the guest account policy.

If it is impossible to generate a guest account under the guest account policy corresponding to a user, the guest account generating unit 160 may not generate a guest account for the guest.

If the guest account generating unit 160 receives an input of a resident registration number as guest information, verification may be performed on the previously-input resident registration number. If it is determined that the resident registration number is not legitimate, the guest account generating unit 160 may not generate a guest account.

The account determining unit 170 may determine the type of an account. Specifically, the account determining unit 170 may determine whether the input password corresponds to a password of the user ID or guest information corresponding to the concerned user, and then a user account or a guest account. If it is determined that the input password corresponds to a user account, the account determining unit 170 may control the account management unit 140 to perform a print job. Alternatively, if it is determined that the input password corresponds to a guest account, the account determining unit 170 determines whether information on the currently-requested guest account exists. If the guest account has not been generated yet, the account determining unit 170 may control the guest account generating unit 160 to generate an account, and if the guest account has already been generated, the guest account generating unit 160 may control the account management unit 140 to perform the print job. The functions of the account determining unit 170 may be included in the control unit 180.

The control unit 180 may control each element included in the account management apparatus 100. Specifically, the control unit 180 may control the user interface unit 120 to display a UI window to receive a setting of a guest account policy from an administrator or a user. If a guest account policy is set through the user interface unit 120, the set guest account policy may be stored in the storage unit 130.

If the control unit 180 receives a request to generate a new guest account from a guest, the control unit 180 may control the guest account generating unit 160 to generate a new guest account dependent on a user account based on guest information and the user account stored in the storage unit 130.

If a request to confirm an account is received from the image forming apparatus 20, the control unit 180 may confirm the account based on the user account and guest account information stored in the storage unit 130 and notify the confirmed result to the image forming apparatus 20.

The control unit 180 may control the communication interface unit 110 to request the image forming apparatus 20 to provide print history of a user and a guest. If the print history of a user and a guest is received thorough the communication interface unit 110, the control unit 180 may store the received print history in the storage unit 130.

As such, the account management unit 100, according to at least one embodiment, may use user information and guest information to easily generate a guest account. Therefore, a guest may easily acquire an account to use the image forming apparatus, and an administrator may easily manage accounts for guests.

FIGS. 3 to 6 are views illustrating various examples of a user interface window which may be displayed on the user interface unit 120 of the account management apparatus illustrated in FIG. 1.

FIG. 3 is a view illustrating an example of a user interface window to receive a setting of a user account.

Referring to FIG. 3, the user interface window 400 may include a section 410 which displays a current user account, and a section 420 which receives a new user's account.

Specifically, the section 410, which displays an already-created user account, displays information on a user, for example, a user's name, a user's ID (a user's log-in), a user type, and an email address preset in the account management unit 100.

The section 420, which receives input to create a user account, includes various items necessary to generate a user account. As illustrated in FIG. 4, if information 420 such as a user's name 421, a user's log-in 423, a password 425, and an email address 427 is input, and an account of the user may be generated as illustrated in FIG. 5.

FIG. 5 is an example of a UI window to receive a setting of a guest account policy.

Referring to FIG. 5, the UI window includes the section 410 which displays a user account and the section 430 which receives a setting of authority regarding the user, and the section 440 which receives a setting of a guest account policy.

Specifically, the section 410, which displays a user account, is a section which displays information on a user who is already registered. An administrator may choose among displayed users a user whose authority or guest account policy would be changed.

The section 430, which receives a setting of authority regarding a user, is a section which receives a setting of authority and an amount of usage regarding a selected user. Through this process, an administrator may set the authority and the amount of usage of an image forming apparatus regarding the user.

The section 440, which receives a setting of a guest account policy, is a section which receives a setting of a guest account policy regarding a selected user. Through this process, an administrator may determine whether or not to allow a guest account for the selected user, and if so, how many guest accounts will be granted, an expiration period of the guest account, and the authority and the amount of usage amount of the guest account.

In the exemplary embodiment in FIG. 5, authority and amount of usage are set regarding a plurality of functions of an image forming apparatus, but the authority and the amount of usage may be set regarding each of a plurality of image forming apparatuses.

Figure 6:
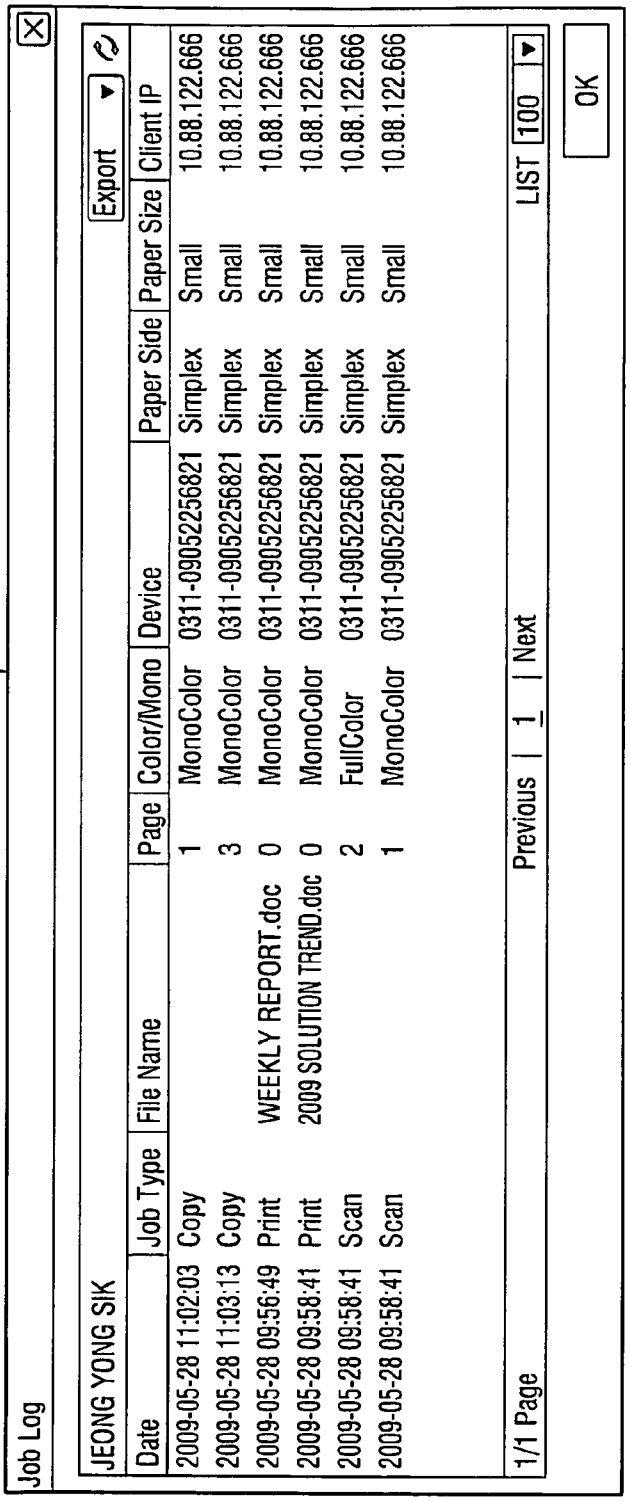

FIG. 6 illustrates an example of a user interface (UI) window displaying print history. In FIG. 6, a UI window 600 which displays only print history of a user is illustrated. However, if there is print history of a guest dependent on the user, the print history of the guest related to the user may be displayed together with the print history of the user. The print history of the guest may be displayed separately.

FIGS. 7 and 8 are views illustrating an example of a generated guest account policy according to at least one embodiment.

Referring to FIG. 7, a guest account policy includes 'ID', 'maxAccountCounts', 'isMonoCopyAvailable', 'isColorCopyAvailable', 'isMonoPrintAvailable', 'isColorPrintAvailable', 'isFaxAvailable', 'isScanAvailable', 'monoCopyQuota', 'colorCopyQuota', 'monoPrintQuota', 'colorPrintQuota', 'faxQuota', and 'scanQuata.'

Specifically, 'ID' is a user ID to which a guest account policy is applied, and 'maxAccountCounts' is the maximum number of guests who may be dependent on a user. "lifetime is an amount of time the guest account may be active. In addition, 'isMonoCopyAvailable', 'isColorCopyAvailable', 'isMonoPrintAvailable', 'isColorPrintAvailable', 'isFaxAvailable', 'isScanAvailable' are information on a guest account representing 'an authority for mono copying', 'an authority for color copying', 'an authority for mono printing', 'an authority for color printing' 'an authority for fax', and 'an authority for scanning' respectively, and 'monoCopyQuota', 'colorCopyQuota', 'monoPrintQuota', 'colorPrintQuota', 'faxQuota', and 'scanQuata' are information regarding an amount of usage of each function for a guest account representing 'usage amount for mono copying', 'usage amount for color copying', 'usage amount for mono printing', 'usage amount for color printing', 'usage amount for fax', and 'usage amount for scanning', respectively.

FIG. 8 is a view illustrating an example of actual data 800 of the guest account policy illustrated in FIG. 7.

In FIGS. 7 and 8, authority and usage amount of a plurality of functions of an image forming apparatus are set in the guest account policy, but the authority and the usage amount of functions of a plurality of image forming apparatuses may be set in the guest account policy.

FIGS. 9 to 10 are views illustrating an example of user information according to at least one embodiment.

Referring to FIG. 9, user information 900 includes a user ID (employee ID), a guest name (customer name), and a guest ID (customer ID). FIG. 10 is an example of actual data of user information illustrated in FIG. 9.

In the illustrated example, only a guest resident registration number is used as a customer ID. However, a guest's phone number or an e-mail address other than a resident registration number may be used, for example, but the customer ID is not limited thereto and may be any other type of identifying information. Alternatively, only the last seven digits of the resident registration number may be used instead of the total digits of the resident registration number, or combination of a resident registration number, a mobile phone number, and an e-mail address may be used.

Figure 11:
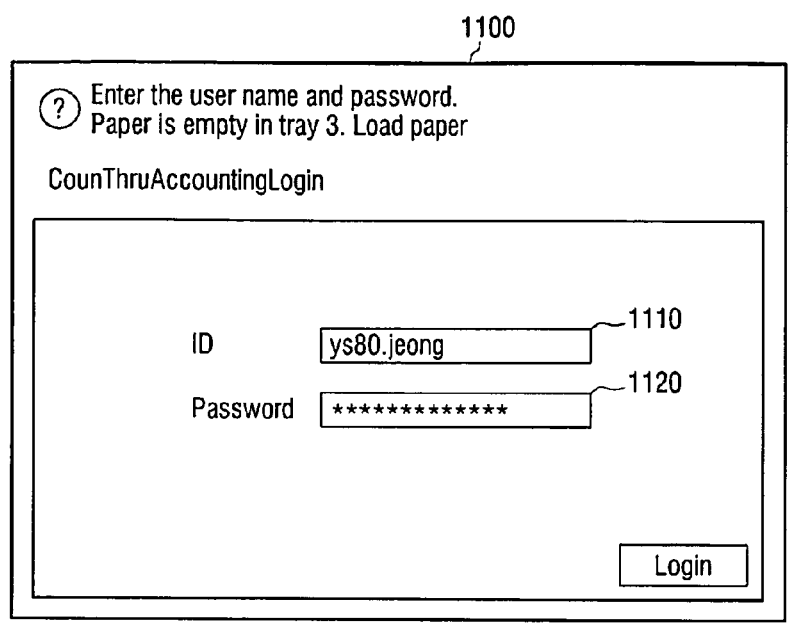
FIGS. 11 to 13 are views illustrating various examples of a user interface window which may be displayed on the print control terminal in FIG. 1.
Figure 12:
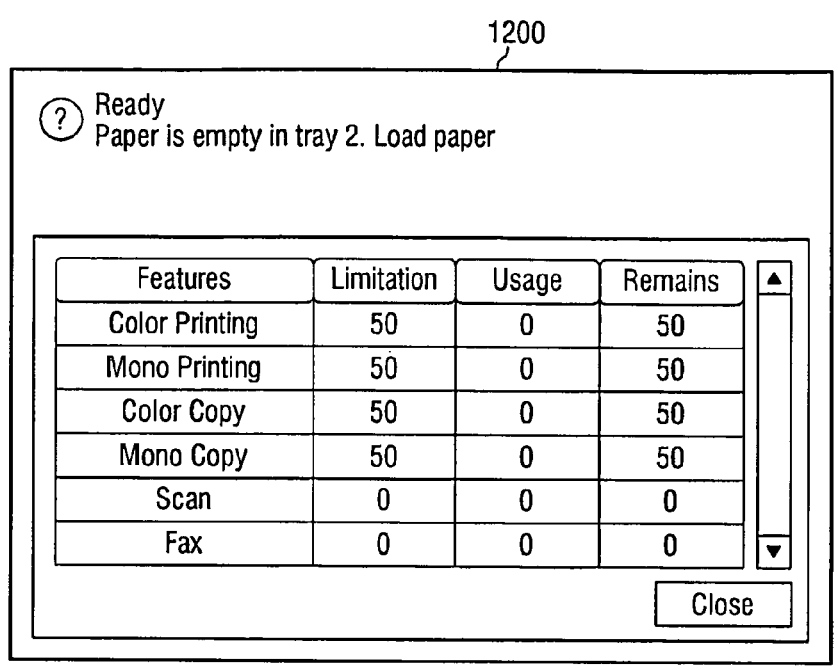
Figure 13:
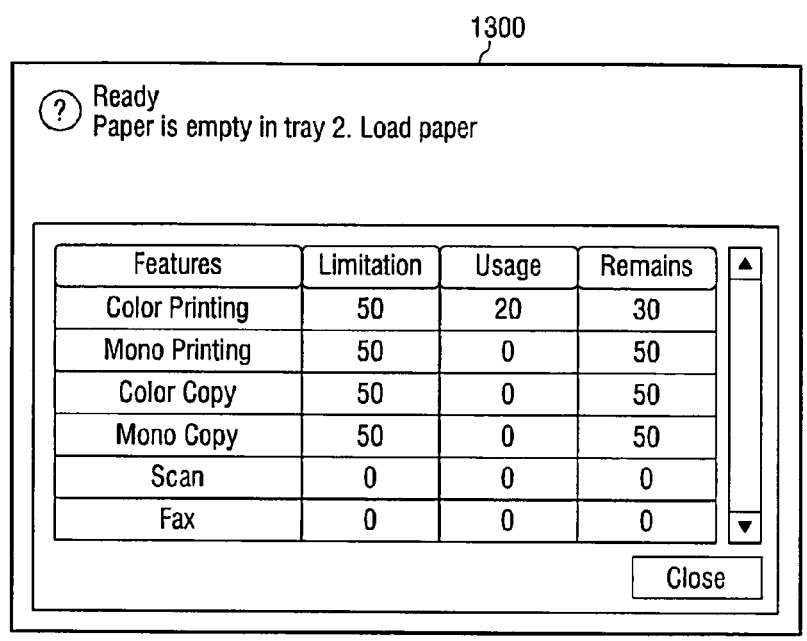

FIGS. 11 to 13 are views illustrating various examples of a UI window which may be displayed on the print control terminal in FIG. 1.

FIG. 11 illustrates a UI window 1100 which is displayed on a print control terminal to use the image forming apparatus 20. If a user who desires to perform a print job has an account e.g., if the user is a staff member, the user may log in by inputting his or her ID and password in an ID section 1110 and a password section 1120.

If a user who desires to perform a print job is a guest who does not have an account, the user may generate a guest account and log in by inputting an ID of a user related to a guest (in other words, a staff member's ID) in the ID section 1110 and the user's information (for example, the resident registration number of the guest) in the password section 1120. In the exemplary embodiment, a guest account is generated using only one guest information, but more than two guest information may be combined and used to generate a guest account. For instance, if a user uses a resident registration number to log in, a mobile phone number or an e-mail address of a user, for example, may be additionally confirmed and then a guest account may be generated.

If a guest account is generated through this process, information 1200 regarding authority and usage amount granted to the guest account may be displayed as illustrated in FIG. 12.

If a guest performs a print job using a guest account, information 1300 reflecting a change in the usage amount after the print job is performed may be displayed as illustrated in FIG. 13.

Figure 14:
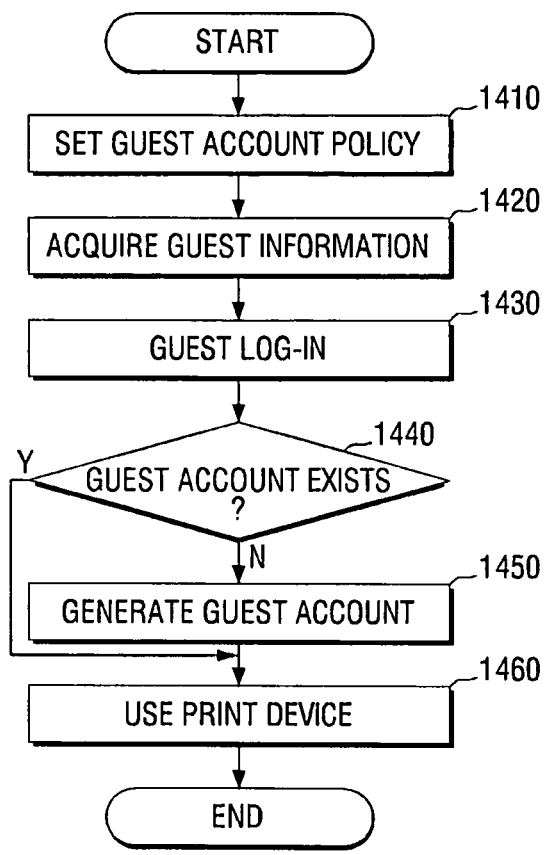
FIG. 14 is a flowchart to explain an account management method according to at least one embodiment.

FIG. 14 is a flowchart provided to explain a method of managing a guest account according to at least one embodiment.

Referring to FIG. 14, a user account and a guest account policy are set first 1410. Detailed operations of setting the guest account policy will be explained below with reference to FIG. 15. Such operations may have already been performed by an administrator.

The guest information is then stored. Specifically, the guest information which is input by a guest or a user (staff or an administrator) through a visitor's reservation or a visitor's request may be stored 1420.

If a guest logs in to use the image forming apparatus (1430), it is determined whether an account for the guest exists (1440). Specifically, if a user ID (a user related to a guest visit) is input as an ID and guest information is input as a password, it may be determined whether a guest account is currently generated or not.

If there exists an account for the guest who logs in (that is, the access is made after a guest account is generated), the image forming apparatus may be controlled so that a print device is used based on the authority of the guest account (1460).

On the other hand, if the account of the guest who logs in does not exist, a guest account may be generated according to a guest account policy (1450). Detailed operations to generate a guest account will be explained below with reference to FIG. 16.

FIG. 15 is a flowchart provided to explain a method of setting a guest account policy according to at least one embodiment.

Referring to FIG. 15, an administrator accesses an account management page (1505). Once the administrator accesses the account management page, a UI window may be displayed as illustrated in FIG. 3.

If an administrator desires to generate an ID of an account of a staff member, the administrator may generate the user account by setting an ID of an account of the staff member (a user) (1510), a password of a staff account (1515) as illustrated in FIG. 4, a setting authority to use a print device of the staff account (1520) using section 430 in FIG. 5, and a setting usage amount of device of the staff account (1525). The generated user account may be stored in the storage unit 130 and managed by the account management unit 140 (1530).

If an administrator grants the authority to generate an account to a staff account (1535), a guest account dependent on the staff account in 440 of FIG. 5 may be set to be generated (1540), the number of guest accounts which may be generated may be designated (1545), an expiration period for a guest account may be set (1550), an authority for a print device which is to be applied to the guest account may be set (1555), a usage amount of a print device which is to be applied to may be set (1560), a guest account policy for the user may be set, and the guest account policy may be stored as illustrated in FIGS. 7 and 8 (1565).

In the at least one embodiment with reference to FIG. 15, a user account is generated while a guest account policy regarding the user account is generated. However, as for a guest account which has already been generated, a guest account policy may be generated only by performing the operations 1535 to 1565 in FIG. 15.

FIG. 16 is a flowchart provided to explain the operation of generating a guest account in FIG. 14 in detail.

First of all, the type of a requested account may be determined (1610). Specifically, in order to determine whether a log-in is made by a user or a guest, whether or not the information input as a requested password is a resident registration number of the guest (or guest information) needs to be identified (1620).

If the information input as a password is a resident registration number (that is, log-in by a guest), visitor information corresponding to the input user ID and guest information corresponding to the visitor information may be identified (1630 and 1640).

Whether or not a guest account policy for the user exists may be identified (1650). Specifically, if there is no guest account policy for the user, a log-in is not allowed so as not to generate a guest account for the user. If there exists a guest account policy for the user, a guest account may be generated based on the guest account policy (1660 and 1670). The generated guest account may be registered in the account management unit (1680).

The method of managing an account, according to at least one embodiment, allows a guest account to be generated easily using user information and guest information. Therefore, a guest may easily obtain an account to use an image forming apparatus, and an administrator may easily manage a guest account. The method for managing an account illustrated in FIG. 14 may be performed not only in the account management apparatus having the configuration of FIG. 2 but also in other account management apparatuses having other configurations.

Although at least one embodiment has been shown and described, it would be appreciated by those skilled in the art that changes may be made in this embodiment without departing from the principles and spirit of the invention, the scope of which is defined in the claims and their equivalents.

What is claimed is:

1. An account management apparatus connected to at least one image forming apparatus, the account management apparatus comprising:
    an account management unit managing a user account of at least one user who uses the image forming apparatus;
    a storage unit storing guest information related to the user account;
    a guest account generating unit generating a guest account, dependent on the user account according to a guest account policy, based on the stored guest information and the user account when a request to generate an account to use the at least one image forming apparatus is received from a guest; and
    a control unit controlling the at least one image forming apparatus based on the generated guest account,
    wherein the guest account generating unit generates the guest account dependent on the user account when user information from the user account is input as an identifier (ID) and the guest information is input as a password.

2. The apparatus according to claim 1, wherein the guest information is at least one of a resident registration number, a mobile phone number, and an email address of the guest.

3. The apparatus according to claim 1, wherein the account management unit makes a request to change the password of the guest account when the generated guest account is accessed for a first time.

4. The apparatus according to claim 1, further comprising:
    a policy management unit managing the guest account policy which is dependent on the user account.

5. The apparatus according to claim 4, wherein the guest account policy includes whether a guest account is authorized to be generated for each user,
    wherein the guest account generating unit generates the guest account after determining that the guest account is authorized to be generated for the guest according to the guest account policy.

6. The apparatus according to claim 4, wherein the guest account policy includes an expiration period,
    wherein the account management unit limits use of the generated guest account when the expiration period ends.

7. The apparatus according to claim 4, wherein the guest account policy includes information regarding authority for use of the at least one image forming apparatus for each guest, and
    wherein the account management unit controls use of the at least one image forming apparatus for the guest according to the guest account policy.

8. The apparatus according to claim 1, further comprising:
    a communication interface unit receiving a print history of the guest from the at least one image forming apparatus,
    wherein the storage unit stores the received print history.

9. A method of managing an account of an account management apparatus connected to at least one image forming apparatus, the method comprising:
    storing a user account of at least one user authorized to use the at least one image forming apparatus and guest information related to the user account;
    receiving a request to generate an account to use the at least one image forming apparatus from a guest;
    generating, by a processor, a guest account, dependent on the user account according to a guest account policy, based on the stored guest information and the user account; and
    controlling the at least one image forming apparatus based on the generated guest account,
    wherein the guest account dependent on the user account is generated when user information from the user account is input as an identifier (ID) and the guest information is input as a password.

10. The method according to claim 9, wherein the guest information is at least one of a resident registration number, a mobile phone number, and an email address of the guest.

11. The method according to claim 9, further comprising:
    requesting to change the password of the guest account when the generated guest account is accessed for a first time.

12. The method according to claim 9, further comprising:
    setting the guest account policy dependent on the user account.

13. The method according to claim 12, wherein the guest account policy includes whether a guest account is authorized to be generated for each user,
    wherein the guest account is generated according to the guest account policy after determining that the guest account is authorized to be generated for the guest.

14. The method according to claim 12, wherein the guest account policy includes an expiration period, and wherein the method further comprises limiting use of the generated guest account when the expiration period ends.

15. The method according to claim 12, wherein the guest account policy includes a usage amount of the at least one image forming apparatus allocated to each guest account,
   wherein use of the at least one image forming apparatus by the guest is controlled according to the guest account policy.

16. The method according to claim 9, further comprising:
   receiving a print history of the guest from the at least one image forming apparatus; and
   storing the received print history.

17. A method of managing an account of an account management apparatus connected to at least one image forming apparatus, the method comprising:
   generating, by a processor, a guest account, dependent on a user account according to a guest account policy, with the user account of at least one user of the at least one image forming apparatus; and
   controlling the at least one image forming apparatus based on the guest account,
   wherein the guest account dependent on the user account is generated when user information from the user account is input as an identifier (ID) and stored guest information is input as a password.

18. A method of managing an account of an account management apparatus connected to at least one image forming apparatus, the method comprising:
   authorizing a user account of at least one authorized user of the at least one image forming apparatus to generate a guest account of a guest to use the at least one image forming apparatus;
   generating, by a processor, the guest account, dependent on the user account according to a guest account policy, when information regarding the user account and information regarding the guest is received at the account management apparatus; and
   controlling the at least one image forming apparatus based on the guest account,
   wherein the guest account dependent on the user account is generated when user information from the user account is input as an identifier (ID) and the guest information is input as a password.

* * * * *